March 28, 1967  J. B. CUMMINS  3,311,038

PANORAMIC CAMERA WITH OFF-AXIS LENS

Filed Oct. 16, 1964  2 Sheets-Sheet 1

INVENTOR
James B. Cummins
by Walter S. Pawl,
ATTORNEY

March 28, 1967 J. B. CUMMINS 3,311,038
PANORAMIC CAMERA WITH OFF-AXIS LENS
Filed Oct. 16, 1964 2 Sheets-Sheet 2

INVENTOR
James B. Cummins
by Walter ATTORNEY

United States Patent Office 3,311,038
Patented Mar. 28, 1967

3,311,038
PANORAMIC CAMERA WITH OFF-AXIS LENS
James B. Cummins, Silver Spring, Md., assignor to
Photogrammetry, Inc., Rockville, Md.
Filed Oct. 16, 1964, Ser. No. 404,216
16 Claims. (Cl. 95—16)

This invention relates generally to wide-angle or panoramic cameras, and in particular to an improved panoramic camera particularly adapted for underwater use and capable of photographing a wide field with substantially no image movement due to displacement of the center of lens rotation from the rear nodal point.

Several panoramic cameras have been devised incorporating rotating lens systems, where the lens rotates about the rear nodal point thereof. In United States patent application Serial No. 231,672, filed October 19, 1962, which was issued as Patent No. 3,141,397 on July 21, 1964, there is described a fixed focus panoramic camera wherein the lens is arranged to rotate about a point placed between the front and rear nodal points thereof.

The point of lens rotation in said prior application is selected so that the image will be in focus for the desired focal length of the camera, and this position is determined according to a novel formula disclosed in said application. While the camera described in said prior application produces pictures with no evidence of image movement, a certain degree of such movement does occur as the lens is rotated about its rotational axis.

The camera of the present invention incorporates an in-line lens system similar to that described in said prior application, said lens system being arranged to rotate about an axis which is positioned according to the formula described in said application. In addition, the present invention incorporates a novel mirror or prism arrangement in the lens system, arranged to correct for the displacement of the axis of rotation from the rear nodal point so as to alter the distance from the axis of rotation to the focal plane in accordance with said displacement, and make this distance equal to the image distance. This has the effect of stopping the image movement during rotation of the lens, and the film may be held stationary in the cylindrical image plane during exposure, or may be fed past the moving exposure slit at the same speed in the opposite direction, which in effect will hold the exposed portion stationary.

The camera of the present invention is also adapted for underwater use, and is especially constructed to be watertight under such conditions. The film is mounted to present a curved surface to the lens, and remains fixed during rotation of the lens system.

It is an object of this invention to provide a fixed focus camera having a capability to take dimensionally accurate panoramic photographs of a relatively wide field of view.

Another object of the subject invention is to provide a fixed focus in-line lens system for a panoramic camera, so constructed and arranged that substantially no image movement resulting from nodal point effects will occur in the focal plane when a portion of said lens system is rotated about an axis positioned between the nodal points thereof.

A further object of the present invention is to provide a panoramic camera for use under water, and which may be easily assembled and disassembled.

Other objects and many of the attendant advantages of the invention will be readily appreciated as the same becomes better understood by reference to the following detailed description when considered in connection with the accompanying drawings, wherein.

The panoramic camera of the invention comprises a watertight cylindrical housing having an arcuate section of a concentric lens mounted in the cylindrical wall thereof. The concentric lens is one component of the lens system of the camera, the remainder of said system comprising a plurality of lens elements mounted in an in-line manner within a lens barrel. The lens barrel is mounted for rotation within the cylindrical housing about an axis perpendicular to the principal axis of said barrel, and in the principal embodiment (FIG. 3) also has therein a pair of mirrors arranged to shorten the distance between the axis of rotation of the lens system and the focal surface in which the film lies without shortening the length of the rays therebetween. The shutter for the camera comprises a narrow vertical slit in the rear focal plane end of the lens barrel, and a film holder is arranged within the housing to hold film properly positioned within the curved focal plane.

The lens system of the invention includes the concentric lens element and the lens elements mounted within the lens barrel. The axis of rotation of the lens barrel is positioned along the longitudinal axis of said barrel, and is disposed relative to the front and rear nodal points of the lens system such that rays emanating from objects spaced from the camera further or closer than the fixed object distance of said fixed focus lens system will cause but an insignificant image movement over the narrow focal plane defined by the shutter slit. The two mirrors or the prism of the invention are arranged to eliminate any image movement due to the eccentricity of the rear nodal point from the axis of rotation. Thus, panoramic photographs may be taken by rotating the lens barrel, and substantially no smearing of the image will occur on a relatively stationary portion of a film at the moment it is being exposed.

As will be further explained hereinafter, the axis of rotation for the lens barrel is located between the two nodal points of the fixed focus lens system and is positioned so that the ratio of the eccentricities of the front and rear nodal points from such axis is made equal to the ratio of the object distance (the distance measured along the principal lens axis from the front nodal point to the object) to the image distance (the distance measured along the principal axis from the rear nodal point to the image).

Figure 1:
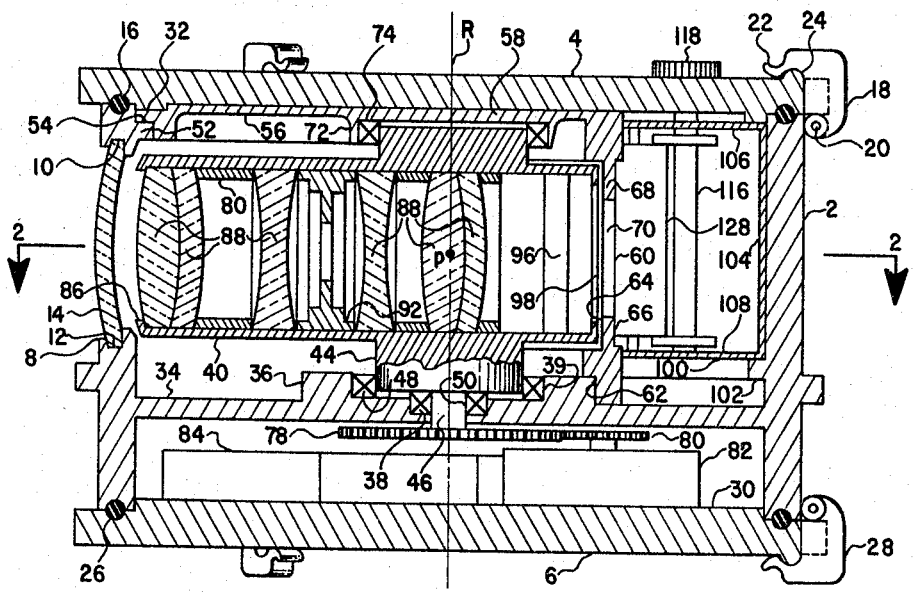
FIG. 1 is a schematic sectional view through the camera of the invention, showing in particular the construction of the lens system and the film holding apparatus.

Referring now to the drawings, a camera constructed according to the invention is shown schematically in section in FIG. 1, and includes a cylindrical housing 2 closed at its ends by top and bottom cover plates 4 and 6, respectively. The housing 2 has an annular opening 8 extending through about 160 degrees in the wall thereof, the top and bottom walls of said opening having grooves 10 and 12 therein for receiving a concentric lens element 14 of like circumferential extent. The lens element 14 has its two curved surfaces formed concentrically about a point P positioned at the intersection of the principal axis of the lens system with the axis of rotation R thereof, and may be installed by initially having the walls of one side of the grooves 10 and 12 turned outwardly to allow insertion of the lens element 14, after which said walls are returned to their initial position.

The top edge of the housing 2 has an annular groove therein for reception of a resilient O-ring seal 16, the confronting surface of the top cover plate 4 having a similar groove therein. A plurality of circumferentially spaced latches 18 are pivotally secured to the top of the housing 2 by pins 20, said latches having resilient arms 22 thereon positioned to engage over a round detent 24 disposed on the peripheral edge of the top cover plate to confront each said latch. The bottom end of the housing 2 and the confronting surface of the bottom plate 6 have confronting annular grooves therein for the reception of an O-ring seal 26, and said bottom plate is held in position on the housing by a plurality of latches 28 identical in construction to the latches 18. The bottom plate 6 has a center upwardly extending protrusion 30 thereon which defines a rim telescopically receivable within the housing 2, and the top cover plate 4 has an annular rim 32 thereon which also fits telescopically within said housing.

The housing 2 has a transverse web 34 extending thereacross below the arcuate opening 8, said web having a boss 36 thereon. The web 34 has a stepped bore 38 centrally thereof, which is positioned concentrically of a counterbore 39 in the boss 36. Disposed within the housing 2 is a lens barrel having on the top and bottom thereof diametrically opposed cylindrical projections 42 and 44, respectively. The bottom projection 44 has a cylindrical shaft 46 extending therefrom; the projections 42 and 44 and the shaft 46 are disposed concentrically about the axis of rotation R. The lower projection 44 is received within the counterbore 39, a ball-bearing unit 48 being interposed between said projection and the wall of said counterbore. The lower face of the projection 44 rests on a second ball-bearing 50 disposed in the upper portion of the stepped bore 38, and the shaft 46 extends through said bore into the portion of the housing below the web 34.

The housing 2 has an inwardly projecting flange 52 extending therein immediately above and over the extent of the opening 8. Disposed to rest upon said flange 52 is the stepped rim 54 of the top radial plate 56 of a support member 58. Said support member 58 includes an axially extending, arcuate, film support 60, FIGS. 1 and 2, which is curved on a radius slightly larger than the distance from the axis R to the rear end of the lens barrel. The film support 60 has a circumferential extent of about 160 degrees, and the lower edge thereof rests upon the web 34; the center portion of said lower edge has a notch 62 cut therein to fit about the boss 36. The inner curved face of the film support has an arcuate recess 64 therein of a size to freely receive the rear end of the lens barrel, and the outer surface of said film support has a recess 66 of an axial extent just slightly larger than the width of the film to be employed with the camera. The web 68 between the two recesses 64 and 66 has an arcuate opening 70 therein which extends over about 140 degrees, and which has a height corresponding to the desired image height on the film to be employed in the camera.

The radial plate 56 has a boss 72 positioned concentrically about the axis R, said boss having a counterbore 74 therein. The top projection 42 on the lens barrel 40 is received within said counterbore, a ball-bearing unit 76 being interposed between said projection and the wall defining said counterbore. Thus, the lens barrel 40 is arranged for rotation about the axis R and is constrained to follow a precisely determined arc.

The shaft 46 has on its lower end a gear 78 which meshes with a gear 80 on the output shaft of an electric motor 82. The motor 80 is supplied with electricity from a battery pack 84, and is actuatable to revolve the lens barrel about the axis R. It is to be understood that while an electric motor has been shown in the drawings, a conventional spring driven motor and governor assembly could be equally well utilized in the camera of the invention.

The lens barrel 40 is positioned in alignment with the concentric lens element 14 and has an inturned lip 86 at its forward end. A plurality of lens elements 88 are assembled within the barrel 40 and are separated where necessary by spacers 90. An aperture 92 is disposed at the proper position among the lens elements 88, and all of said elements are secured in position in the usual manner, as by cement or by interengaging threads between the spacers 90 and the inner wall of said lens barrel. Disposed between the last of the lens elements 88 and the end of the lens barrel, in a position to be hereinafter more fully described, are a pair of mirrors 94 and 96 supported on posts to the wall of said lens barrel. The rear end of said lens barrel is cut to permit rotation without engagement with the support 60, and has a vertical slot 98 therein which comprises a shutter for the camera. Typically, the slot 98 will measure about one degree in width by about forty degrees in height, and is positioned on the principal axis of the lens barrel 40.

Disposed within the housing 2 behind the support 60 is a film chamber 100, said chamber resting upon an arcuate, inwardly directed flange 102 on the housing 2. The chamber 100 includes an axial wall 104, a top wall 106, a bottom wall 108 and a pair of end walls 110, all of which are interconnected. Supported within the chamber 100 on shafts 112 is a film casette 114, which faces in a position to exhaust film away from the lens barrel. A take-up spool 116 is mounted between the plates 106 and 108 oppositely of the casette 114, and a take-up winding knob 118 extends from said take-up spool through the top plate 4 of the camera. Disposed at opposite ends of the holder 60 and immediately adjacent thereto are a pair of rollers 120 and 122, said rollers being supported by the top and bottom plates of said chamber. Disposed radially outwardly of the roller 120 is a larger roller 124, and disposed radially outwardly of the roller 122 is a roller 126 of a size similar to that of said roller 122. Disposed between the roller 126 and the take-up spool 116 is a tension roller 128. It is understood that each of the rollers is supported by the top and bottom plates of the film chamber.

In use, film 130 (FIG. 2) is fed from the casette 114, around the roller 124, around the roller 120, into the recess 66 in the holder 60, and thence around the roller 122. From the roller 122 the film passes around the roller 126, around the tension roller 128, and is wound upon the spool 116. Thus when the film is disposed in the recess 66 it presents a fixed arcuate surface to the image formed at the focal plane lying at said surface by light passing through the lens system.

Figure 2:
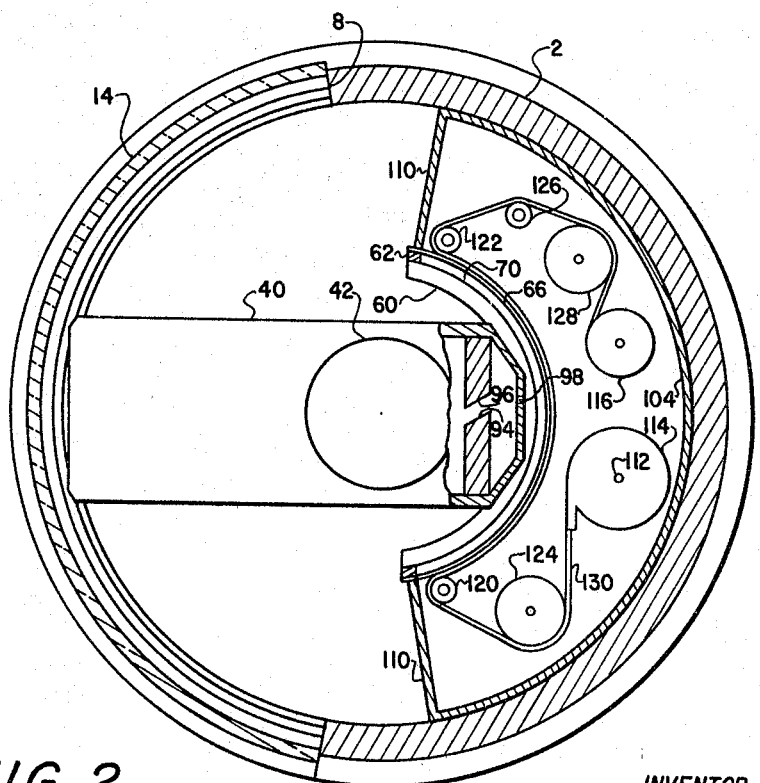
FIG. 2 is a cross-section taken generally along the line 2—2 in FIG. 1, showing the construction of the lens system and the film holding apparatus.

The axis of rotation R of the camera of FIGS. 1 and 2 is positioned according to the formula disclosed in the above identified prior application. More specifically, said axis is positioned as follows. The lens system of the camera has a fixed focus of several feet, and the in-line lens system has a front and rear nodal point. It has been found that by positioning the axis of rotation of the in-line lens system between the two nodal points at a certain position, image movement at the focal plane may be largely eliminated.

The formula for positioning the axis of rotation, as was explained in the prior application, is as follows:

$$E_1/E_2 = D/d$$

where:

$E_1$ = the eccentric distance between the axis of rotation and the front nodal point, $E_2$ = the distance between the axis of rotation and the rear nodal point, $D$ = the distance measured on the principal axis of the lens from the front nodal point to the object, $d$ = the distance measured from the rear nodal point to the image in the focal plane.

When the axis of rotation is positioned according to this formula, an insignificant image movement in depth will result in the focal plane from rotation of the lens barrel about said axis. However, especially with stationary film, the amount of image movement may be greater than is desired. In many prior cameras the lens system was rotated about the rear nodal point, in which case no image movement resulted. However, when the axis of rotation is positioned between the nodal points, it is apparent that some image movement must result. The two mirrors 94 and 96 of the illustrated form of present invention compensate for the removal of the axis of rotation from the rear nodal point, and thus combine the advantages of cameras having the axis of rotation pass through the rear nodal points, with the advantages of the camera of the prior application referred to above.

Figure 3:
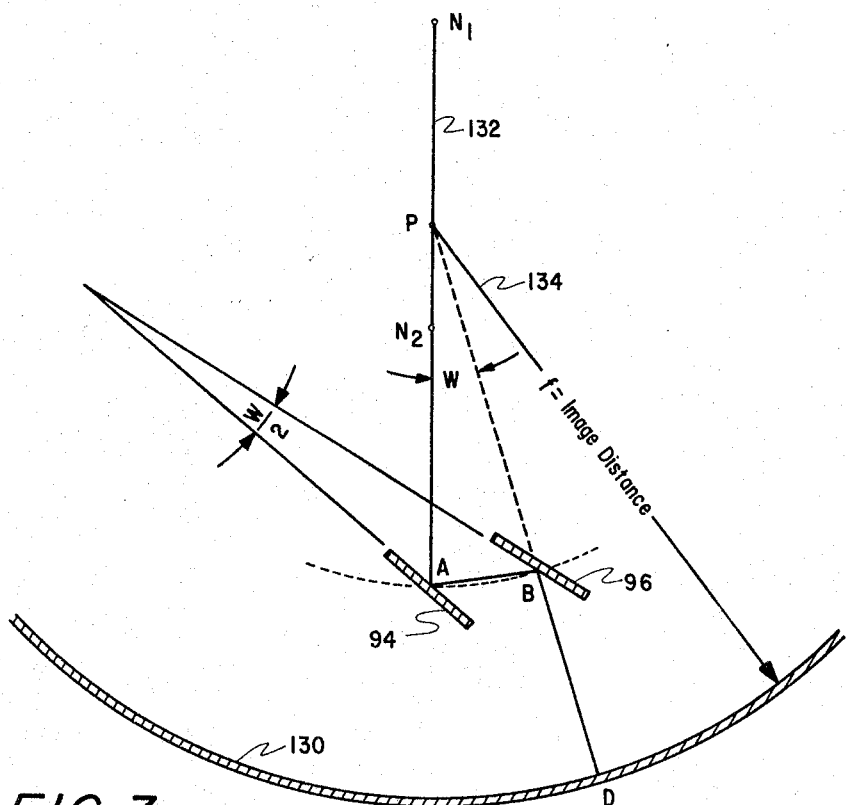
FIG. 3 is a diagrammatic view showing the manner in which the mirror arrangement of the invention is disposed.

Referring now to FIG. 3, the lens system is shown in diagrammatic form. The principal axis of the lens is indicated at 132, and has positioned thereon the point P through which the axis of rotation R extends perpendicularly to the axis 132; the point P is indicated according to the formula hereinabove set forth. Forwardly of the point P is the front nodal point of the lens system, indicated at $N_1$, and rearwardly thereof is the rear nodal point, $N_2$. Disposed behind the lens is the film 130, which is disposed in the focal plane of the camera; thus, the distance 134 measured from the point P to the film is equal to the image distance.

The purpose for the mirrors 94 and 96 is to decrease the distance from the point of rotation, P, to the focal surface by a distance equal to the rear nodal point eccentricity, which is the distance measured from P to $N_2$. Referring to FIG. 3, the two mirrors 94 and 96 are spaced so that the centers A and B, respectively, thereof are separated by a distance AB equal to the rear nodal point eccentricity, or the distance measured from $N_2$ to P; as is indicated in said FIG. 3, the two points A and B are disposed an equal radial distance from the point P.

The planes of the two mirrors 94 and 96 are disposed at an angle to each other having a value equal to one-half of the angle W between line PA and the line PB, whereby light passing through the lens system along the principal axis 132 will be reflected onto the film at a point D, which point D is in alignment with point B and point P.

The effect of the mirror arrangement of FIG. 2 is to make the distance PA added to the distance BD equal to the image distance $f$. This unique arrangement makes it appear as if the image comes from point P rather than from point $N_2$, and hence the camera suffers from no more image movement than it would if the lens system revolved about the rear nodal point thereof.

In certain camera lens systems the front and rear nodal points may be reversed. The present concept of introducing an optical device into the lens system to make the light seem to emanate from the axis of rotation can also be employed with such lens systems, such an arrangement being shown in FIG. 4.

Figure 4:
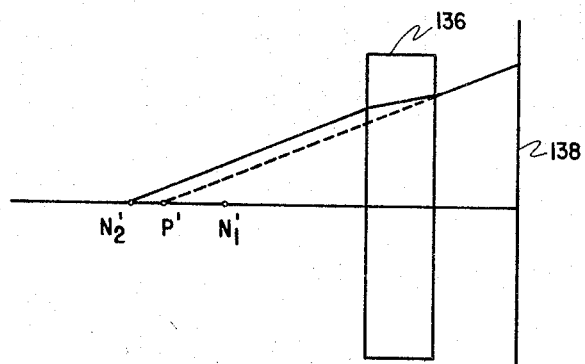
FIG. 4 is a diagrammatic view of another embodiment of the invention, wherein a prism is employed to compensate for those lens systems having reversed nodal points.

In FIG. 4, the axis of rotation of the lens system passes through point P', and the front and rear nodal points $N_1'$ and $N_2'$, respectively, are positioned on opposite sides thereof, as in FIG. 3 except that their positions are reversed. A rectangular prism 136 is placed between the nodal point $N_1'$ and the focal plane 138, in place of the mirrors 94 and 96, and serves to lengthen the distance from the point P' to the focal plane. The prism is chosen so that the diffraction of light passing therethrough lengthens the path from the plane 138 to the point P' by a distance equal to the line $N_2'P'$, and thus the result is that the light is made to appear as if it emanated from the axis of rotation, which passes through the point P'.

It is thus seen that a panoramic camera has been provided by this invention which will permit the taking of dimensionally accurate underwater panoramic pictures, the camera being watertight and being easily assembled and disassembled for access to the film chamber and other components thereof.

Obviously, many modifications and variations of the present invention are possible in the light of the above teachings. It is therefore to be understood that within the scope of the appended claims the invention may be practiced otherwise than as specifically described.

What is claimed is:

1. In a camera, a housing, an in-line lens system mounted within said housing and including a plurality of lens elements mounted within a lens barrel, said lens system having spaced front and rear nodal points and said lens barrel being mounted for rotation about an axis disposed perpendicular to the principal axis of said lens system and spaced between said nodal points, and means for altering the distance from the axis of rotation to the focal surface of the camera by a distance equal to the distance between said rotational axis and said rear nodal point.

2. The combination as recited in claim 1, wherein said rear nodal point is positioned between said rotational axis and said focal surface, and wherein said means includes a mirror arrangement for decreasing the distance from the axis of rotation to the focal surface of the camera.

3. The combination as recited in claim 1, wherein said rear nodal point is positioned on the opposite side of said rotational axis from said focal surface, and wherein said means includes a prism arranged to increase the distance from the axis of rotation to the focal surface of the camera.

4. In a camera, a housing, an in-line lens system mounted within said housing and including a plurality of lens elements mounted within a lens barrel, said lens system having spaced front and rear nodal points and said lens barrel being mounted for rotation about an axis disposed perpendicular to the principal axis of said lens system and spaced forwardly from said rear nodal point, and means for decreasing the distance from the axis of rotation to the focal surface of the camera by a distance equal to the distance between said rotational axis and said rear nodal point.

5. The combination as recited in claim 4, wherein said means comprises a pair of spaced reflective surfaces disposed to receive light from said rear nodal point and to reflect it upon said focal surface along a radial axis emanating from said rotational axis.

6. In a camera, a housing, an in-line lens system mounted within said housing and including a plurality of lens elements mounted within a lens barrel, said lens barrel being mounted for rotation about an axis perpendicular to the principal axis of said lens system, said lens system having an object distance, an image distance, and spaced front and rear nodal points, said axis of rotation being positioned so that the ratio of the distance between said rotational axis and said front nodal point to the distance between said rotational axis and said rear nodal point is equal to the ratio of said object distance to said image distance, and means mounted within said lens barrel for altering the distance from the axis of rotation to the focal surface of the camera by a distance equal to the distance between said rotational axis and the rear nodal point so as to make it equal to the image distance.

7. The combination as recited in claim 6, wherein said last mentioned means comprises a pair of spaced reflective surfaces disposed to receive light from said rear nodal point and to reflect it upon said focal surface along a radial axis emanating from said rotational axis.

8. The combination as recited in claim 7, wherein said reflective surfaces are mounted within said lens barrel rearwardly of the last lens element disposed therein.

9. In a camera, a housing, a rotatable lens system having a stationary spherical lens element positioned in the side wall of said housing and having its opposite faces extending concentrically about the point of intersection of the axis of said lens system with its axis of rotation, a lens barrel for said lens system mounted within said housing for rotation about the axis of rotation of said lens system, said lens barrel being disposed to confront said concentric lens element, a plurality of lens elements mounted in said lens barrel, said plurality of lens elements and said concentric lens element comprising a lens system having an object distance, an image distance, and spaced front and rear nodal points, said axis of rotation being positioned forwardly of said rear nodal point, and means mounted within said lens barrel behind the lens elements therein for decreasing the distance from the axis of rotation to the focal surface of the camera by a distance equal to the distance between said rotational axis and said rear nodal point.

10. The combination as recited in claim 9, wherein said means comprises a pair of spaced reflective surfaces disposed to receive a light beam from said rear nodal point and to reflect it upon said focal surface along a radial axis emanating from said rotational axis.

11. The combination as recited in claim 10, wherein said axis of rotation is positioned so that the ratio of the distance between said rotational axis and said front nodal point to the distance between said rotational axis and said rear nodal point is equal to the ratio of said object distance to said image distance.

12. A camera, comprising a housing, a rotatable lens system having a stationary spherical lens element disposed in the side wall of said housing and having its opposite faces extending concentrically about the point of intersection of the axis of said lens system with its axis of rotation, a lens barrel for said lens system mounted within said housing for rotation about the axis of rotation of said lens system, said lens barrel being disposed to confront said concentric lens element and containing a plurality of in-line lens elements therein, said concentric lens element and said plurality of lens elements comprising an in-line lens system having an object distance, an image distance, and spaced front and rear nodal points, said axis of rotation being positioned forwardly of said rear nodal point, film holder means mounted within said housing behind said lens barrel and arranged to present an arcuate film surface to said lens system, the radius of curvature of said film surface emanating from said axis of rotation, and means mounted within said lens barrel behind the lens elements therein for decreasing the distance from the axis of rotation to said film surface by a distance equal to the distance between said rotational axis and said rear nodal point.

13. The combination as recited in claim 12, wherein said axis of rotation is positioned so that the ratio of the distance between said rotational axis and said front nodal point to the distance between said rotational axis and said rear nodal point is equal to the ratio of said object distance to said image distance.

14. The combination as recited in claim 13, wherein said means for decreasing distance comprises a pair of spaced reflective surfaces disposed to receive light from said rear nodal point and to reflect it upon said film surface along a radial axis emanating from said rotational axis.

15. A camera, comprising a housing, a rotatable lens system having a stationary spherical lens element disposed in the side wall of said housing and having its opposite faces extending concentrically about the point of intersection of the axis of said lens system with its axis of rotation, a lens barrel for said lens system mounted within said housing for rotating about the axis of rotation of said lens system, said lens barrel being disposed to confront said concentric lens element and containing a plurality of in-line lens elements therein, said concentric lens element and said plurality of lens elements comprising an in-line lens system having an object distance, an image distance, and spaced front and rear nodal points, said axis of rotation being positioned between said nodal point, film holder means mounted within said housing behind said lens barrel and arranged to present an arcuate film surface to said lens system, the radius of curvature of said film surface emanating from said axis of rotation, and said rear nodal point being positioned on the side of said axis of rotation opposite said film surface, and means mounted within said lens barrel behind the lens elements therein for increasing the distance from the axis of rotation to said film surface by a distance equal to the distance between said rotational axis and said rear nodal point.

16. The combination as recited in claim 15, wherein said last-mentioned means comprises a rectangular prism.

References Cited by the Examiner
UNITED STATES PATENTS
3,141,397   7/1964   McNeil _____ 95—15

JOHN M. HORAN, *Primary Examiner.*